United States Patent [19]

Iwase et al.

[11] 3,956,186

[45] May 11, 1976

[54] ALUMINA COATING FOR SOLID CARRIERS FOR CATALYSTS

[75] Inventors: Tetsumi Iwase, Okazaki; Hideki Hara, Toyota, both of Japan

[73] Assignee: Toyota Jidosha Kogyo Kabushiki Kaisha, Toyota, Japan

[22] Filed: Sept. 30, 1974

[21] Appl. No.: 510,719

[30] Foreign Application Priority Data

Oct. 11, 1973   Japan............................... 48-114218

[52] U.S. Cl............................. 252/455 R; 252/457; 252/462

[51] Int. Cl.$^2$..................... B01J 29/00; B01J 29/06; B01J 23/10

[58] Field of Search................ 252/455 R, 457, 463, 252/462

[56] References Cited

UNITED STATES PATENTS

| | | | |
|---|---|---|---|
| 2,941,960 | 6/1960 | Hindin et al. | 252/455 R |
| 3,146,210 | 8/1964 | Baldwin | 252/457 X |
| 3,524,721 | 8/1970 | Stephens | 252/457 X |
| 3,743,709 | 7/1973 | Shaw et al. | 252/463 X |

*Primary Examiner*—Carl F. Dees
*Attorney, Agent, or Firm*—Brisebois & Kruger

[57] ABSTRACT

A solid carrier for catalytic material is coated with a slurry composed of alumina hydrate ($Al_2O_3 \cdot nH_2O$) dried at 250°~350°C, colloidal silica and water. Said carrier, after drying, is immersed in an aqueous solution of aluminum nitrate ($Al(NO_3)_3$) containing a nitrate of barium, lanthanum or another rare earth element and then dried and fired.

9 Claims, No Drawings

ALUMINA COATING FOR SOLID CARRIERS FOR CATALYSTS

BACKGROUND OF THE INVENTION

The purification of plant fumes or automotive emission gases takes place in a gaseous phase reaction with high space velocity and the catalyst carrier used for this purpose is a heat-resistant solid carrier which is catalytically inert. Commonly, a carrier coated with a fireproof metallic oxide such as alumina and treated with a catalytic component such as a metal of the platinum family has been used.

The method of producing the above-mentioned catalyst has been disclosed in U.S. Pat. Nos. 3,264,228, 3,331,787 and 3,565,830, but such a catalyst has been found controversial for the following reasons.

First, the catalytic reaction takes place at high temperatures and accordingly the catalyst bed becomes as hot as 800°~°C. Moreover, through long, continuous use, the catalyst produced by the conventional method has its coating and its catalytic component heavily sintered, resulting in a drastic decrease in its catalytic activity. Secondly, the alumina hydrate coating becomes cracked or chalked through dehydration during firing. Adhesion to the carrier is insufficient with liability to peeling. The use of such a catalyst for the purification of auto emission gas is impossible because the catalyst is exposed continuously to strong vibration and fast gas flow. Thirdly, in the common practice of coating the carrier with a slurry, on account of its strong thixotropy, the viscosity of the slurry increases with time, and it soon gets caked and hardens. Thus it is extremely difficult to keep the amount of the coating and the quality of the coating constant, which makes it impossible to make continuous use of the same slurry, resulting in poor workability and poor efficiency in the utilization of materials, which represents an economic disadvantage.

SUMMARY OF THE INVENTION

The object of the present invention is to provide a method of coating a solid carrier made of a catalytically inert, heat-resistant inorganic substance with an active alumina which can increase the catalytic effect of the catalytic component when said catalytic component is applied to the carrier.

DETAILED EXPLANATION OF THE INVENTION

The present invention aims at producing a carrier for a catalyst for use in the purification of automotive emission gases. According to the present invention, a solid carrier is coated with alumina which withstands long, continuous service at high temperatures, is strong and subject to little thermal deterioration, and has a strong bonding power; whereby a catalytic filter of constant quality with high workability can be produced economically.

The features of the method according to the present invention will be described below.

The first feature: When a catalyst carrier conventionally coated with active alumina is exposed to temperatures higher than 800°C, $\gamma$-alumina which excels in surface area activity turns into a stable $\alpha$-alumina with a decreased specific surface area and a lowered activity. The carrier coated according to the present invention, however, virtually retains its entire activity, even when subjected to prolonged heat treatment at 800°C. Especially when it is used to carry a catalyst for exhaust gas purification, under high reaction temperatures this feature is highly advantageous.

The second feature: A hardness unattainable by conventional methods can be obtained. The bonding power is so strong that a crack-free, thin, active alumina coating can be obtained.

The third feature: The slurry used in the present invention is uniform in quality. By constantly replacing the portion used, the slurry can be used continuously, giving an adhesive, uniform active alumina coat with high efficiency and good economy.

These features of the present invention contribute to making the alumina coating resistant to high temperatures, hard, and adhesive, and making the slurry less subject to aging.

It is common knowledge that in the case of the VIII group in the Periodic Table of the Elements, i.e., metals of the platinum family, their catalytic activity depends on the inherent properties of these metals which generate little heat in oxidation. Insofar as the oxides of the same metals are concerned, however, their catalytic activity is higher in various crystallized states in dependence on the manufacturing history, so that the thermodynamic enthalpy is great in the case of lattice defects, linear defects or lattice irregularity. These states are unstable and under heating so-called thermal deterioration of catalyst takes place, so that these defects decrease and the particle diameter increases.

The first feature of the present invention contributes to producing a highly heat-resistant alumina coating by retaining the instability of the active alumina by introducing a solid solution of a metal having a large ion-radius, such as barium or a lanthanide or rare earth element into the crystal lattice of the active alumina. This solution should contain 0.01–1.0 mol/l of the barium, lanthanide or rare earth metal, which is introduced in the form of its nitrate. The second feature of the present invention makes it possible to provide a hard, adhesive alumina coating efficiently and economically.

When a conventional mixture of Boehmite, gibbsite, bayerite, hydrargillite and so on is employed as the alumina hydrate, the coating, when dried, inevitably shrinks through dehydration and the resulting cracking causes chalking. To avoid this, a fired powder of active alumina has been used, but the thixotropy of active alumina causes caking of the slurry, thereby making it extremely difficult to attain both characteristics.

According to the present invention, the two problems are simultaneously solved by subjecting the alumina hydrate to prolonged heating (for 1–24 hours) at 250°–350°C, thus thoroughly dehydrating the resulting powder, which is reduced in volume, and then adding to it a coat-hardening agent such as an aqueous solution containing 1–30% by colloidal silica or 1–50% aluminum nitrate by weight. The resulting slurry should contain 40~60% of alumina hydrate by weight. The preliminary heating by which the alumina hydrate is converted from a mixture of monohydrate and trihydrate to a virtual monohydrate of Boehmite is basically different from the operation of simply preparing a fine powder as disclosed in U.S. Pat. No. 3,264,228. It is conceivable that the operation could be started with Boehmite alone, but without preliminary heating the particles would be coarse and accordingly, the powder would not be adhesive. Thus, the preliminary heating has the two functions of producing Boehmite and fine powder. Therefore, the preliminary heating is desirably done at 250°–300°C, at which temperature the bonding water is almost eliminated. At over 400°C, the water content of the hydroxide will be completely eliminated and the powder will turn into alumina. The third feature of the present invention is that the use of previously heated alumina hydrate changes in slurry properties such as viscosity, due to "aging" is prevented, so that practically all of the slurry may be utilized.

The use of a fine powder obtained by preliminary heating causes an improvement in adhesion through hardening due to so-called molecular agglomeration, but this is still insufficient and a coat-hardening agent has to be employed. Specifically, the use of a fine powder of colloidal silica and the formation of fine Boehmite obtained by the neutralization of aluminum nitrate make the alumina coat harder and more adhesive. Aluminum nitrate when fired after dried, decomposes, releasing NO or $NO_2$ gas, which activates the surface of aluminum and silica and strengthens the bond of aluminum to silica.

The coexistence of aluminum nitrate and slurry induces agglomeration and the precipitation of colloids, resulting in an increased viscosity. Therefore, it is desirable to add aluminum nitrate after the coating treatment.

The solid carrier to be employed in the present invention consists mainly of alumina, silica, magnesia or a ceramic mixture of these substances, and contains high melting-point inorganic substances such as silicon carbide, silicon nitride, and the like.

A solid carrier of honeycomb structure carrying the catalytic component, when utilized as a catalyst for the purification of automotive emission gas, is quite valuable, because its vessel is easy to manufacture; the pressure loss is low; the warmup performance is good; and there is no wear. To be solid, however, the carrier has to be made of a strong material having a surface area less than 10 $m^2/g$ and a low porosity. For the purpose of strengthening the bond between the carrier and the alumina coating, the carrier has to be full of fine holes ranging from several hundred microns in diameter or preferably of 5–50 microns, with porosity of 20~40% and a specific surface area of 15–30 $cm^2/cm^3$.

Other materials to be used may be anything commercially available with high purity, but the infiltration of such catalyst poisons as sodium ions, chlorine ions, phosphorus ions, etc. should be avoided.

The following are several examples of methods of carrying out the present invention.

EXAMPLE 1

Alumina hydrate powder was thinly spread on a porcelain dish and heated to dry for 24 hours in an electric furnace set at 300°C. 160 g of the alumina hydrate thus dried was dispersed in 200 ml of a 30% solution of colloidal silica diluted with four times as much distilled water and well agitated to make a slurry. A solid carrier was immersed in this slurry and after penetration of the slurry into the pores of the carrier, the carrier was removed. Excess slurry was removed by blasting with compressed air. The carrier was then dried for one hour in a circulatory drying furnace at 150°C.

A sample taken from said carrier was dipped in an aqueous solution containing 30% aluminum nitrate, removed, again dried for 1 hour at 150°C, and then fired at 800°C for 2 hours in an electric furnace.

To test the bonding strength of the alumina coat, a sample was submerged in distilled water and subjected to 1 hour of ultrasonic oscillation at 28 KC. The ratio of fallen alumina to the total weight of alumina was determined and compared with the result obtained in a similar test of a conventional coating. The conventional coating used for comparison was that of a monolithic type catalyst (PTX-IIB) of Engelhard Inc., U.S.A. The results of this comparison are summarized in Table 1.

Table 1

| Results of comparison in bonding strength of alumina coats | | |
|---|---|---|
| | Conventional method | Present invention |
| Weight loss (%) | 25 – 30 | 1 – 2 |

As evidenced by the foregoing test, the process of Example 1 produced a product having excellent adhesion when subjected only to vibration, but in order to maintain this adhesion when subjected to high temperatures as well, the incorporation of a nitrate of barium, lanthanum, or another rare earth metal proved necessary, and the following Example discloses a representative process for doing so.

EXAMPLE 2

In the same way, 160 g of preliminarily dried alumina hydrate was dispersed in 200 ml of 30% colloidal silica diluted with distilled water as above; and well agitated to make a slurry. A solid carrier was immersed in this slurry; after penetration of the slurry into the pores of the carrier, said carrier was withdrawn and any excess slurry eliminated by blasting with compressed air. The carrier was then dried for 1 hour in a circulatory drying furnace at 150°C. A sample of said carrier was immersed for 30 seconds in an aqueous solution of 30% aluminum nitrate containing 0.2 mol/l of lanthanum nitrate, removed, again dried for 1 hour at 150°C, and then fired for 2 hours at 800°C in an electric furnace.

The carrier coated with said alumina was immersed for about 3 hours in an aqueous solution of palladium chloride containing 0.2 g/l palladium (PH3.6), was reduced with 2 g/l of an aqueous solution of sodium borohydride, thoroughly washed with water, and then again washed with hot water, and fired for 2 hours at 600°C to make a catalyst. The catalyst thus obtained was placed in an electric furnace for 2 hours of heat treatment at 800°C, 900°C, 1000°C and 1100°C. A sample of the catalyst was measured for $C_3H_8$-conversion rate (%) and CO-conversion rate (%) under the catalyst activity measuring conditions set forth in Table 2.

Table 2

| Catalyst activity measuring conditions | | |
|---|---|---|
| Composition of gas introduced | | CO:1%, $C_3H_8$:500 ppm, $O_2$:4%, $N_2$:balance |
| Flow rate of gas | | 5 l/min |
| Temperature of gas | | 300°C |
| Space velocity | | about 10,000 $hr^{-1}$ |
| Instrument | CO | Non-dispersion infrared analyzer (NDIR) |
| | $C_3H_8$ | Flame ion detector (FID) |

The results are summarized in Table 3. 1.

Table 3

Catalyst activity comparison test (immersion in lanthanum nitrate)

| Heat treatment | $C_3H_8$ — Conversion rate (%) | | | | | CO — Conversion rate (%) | | | | |
|---|---|---|---|---|---|---|---|---|---|---|
| | as prepared | 800°C | 900°C | 1000°C | 1100°C | as prepared | 800°C | 900°C | 1000°C | 1100°C |
| Present invention | 98 | 92 | 82 | 79 | 75 | 95 | 95 | 94 | 94 | 92 |
| Conventional product | 95 | 93 | 66 | 58 | 8 | 96 | 95 | 92 | 80 | 80 |

The conventional product used was a monolithic type solid-ceramic carrier coated with a catalyst of the Pt-Pb system and sold under the trade name PTX-IIB by Engelhard Inc., U.S.A.

EXAMPLE 3

Except that instead of lanthanum nitrate in Example 2, barium nitrate was used and an aqueous solution of 30% aluminum nitrate containing 0.2 mol/l of barium was used for 30 seconds of immersion, the same treatment as in Example 2 was used on the alumina coating. The subsequent addition of palladium nitrate and measurement of catalyst activity were also executed in the same way as in Example 2 and then the $C_3H_8$-conversion rate (%) and Co-conversion rate (%) were measured. The results are summarized in Table 4.

Table 4

Catalyst activity comparison test (immersion in vanadium nitrate)

| Heat treatment | $C_3H_8$ — Conversion rate (%) | | | | | CO — Conversion rate (%) | | | | |
|---|---|---|---|---|---|---|---|---|---|---|
| | as prepared | 800°C | 900°C | 1000°C | 1100°C | as prepared | 800°C | 900°C | 1000°C | 1100°C |
| Present invention | 97 | 94 | 80 | 75 | 32 | 95 | 95 | 92 | 90 | 90 |
| Conventional method | 95 | 93 | 66 | 58 | 8 | 96 | 95 | 92 | 80 | 80 |

The conventional product used was a monolithic type solid-ceramic carrier coated with a catalyst of the Pt-Pb system and sold under the trade name PTX-IIB by Engelhard Inc., U.S.A.

EXAMPLE 4

In the same way as in Example 2, a cylindrical catalyst measuring 90 mm by 75 mm was prepared and compared with one of the same dimensions prepared by the conventional method under the following conditions.

Table 5

| | Engine bench test conditions |
|---|---|
| Engine | 1,800 cc Engine |
| Operating conditions | 60 mph (15 min.), 30 MPH (5 min.) mode |
| Emission | 60 mph CO1.5 – 2.5%, HC70 – 200 ppm |
| Condition | 30 mph CO1.3 – 4.0%, HC70 – 350 ppm |
| Converter temperature | 60 mph 650 – 760°C |
| Temperature | 30 mph 350 – 400°C |
| Space velocity | 60 mph 240,000 |
| | 30 mph 100,000 |

The results of the tests are summarized in Table 6.

Table 6

| Test period (hr) | | Results of engine bench test | | | | | | | | | |
|---|---|---|---|---|---|---|---|---|---|---|---|
| | | $C_3H_8$ — conversion rate (%) | | | | | CO — conversion rate (%) | | | | |
| | | Initial stage | 25 | 50 | 75 | 100 | Initial stage | 25 | 50 | 75 | 100 |
| 60 mile/hr | Present invention | 75 | 71 | 60 | 52 | 50 | 98 | 90 | 85 | 82 | 80 |
| | Conventional method | 75 | 68 | 50 | 41 | 35 | 95 | 80 | 72 | 60 | 48 |
| 30 mile/hr | Present invention | 78 | 70 | 66 | 60 | 68 | 100 | 98 | 96 | 95 | 95 |
| | Conventional method | 70 | 52 | 40 | 32 | 30 | 95 | 90 | 88 | 85 | 70 |

What is claimed is:

1. A method of coating a porous, heat-resistant catalytically inert ceramic carrier for a catalyst which comprises the steps of
   coating said carrier with a slurry containing alumina hydrate which has been dried at 250°–350°C for at least 1 hour, colloidal silica, and water,
   drying said carrier,
   immersing said dried carrier in an aqueous solution of aluminum nitrate containing a nitrate of a metal selected from the group consisting of barium lanthanum and the lanthanides,
   removing said carrier from said solution, and drying and firing said carrier.

2. Method as claimed in claim 1 in which said coating is applied to a carrier having a porosity of 20–40% and a specific surface area of 15–30 cm²/cm³.

3. Method as claimed in claim 1 in which said carrier is immersed in said aqueous nitrate-containing solution for at least 1 hour at a temperature of at least 150°C 4. Method as claimed in claim 1 in which said firing is carried out at at least 800°C for at least 2 hours.

5. Method as claimed in claim 1 which comprises the additional step of immersing said fired ceramic in a catalyst solution, removing said carrier from the catalyst solution and again firing the catalyst to produce a catalytic device for the treatment of automotive exhausts.

6. Method as claimed in claim 1 in which said slurry contains 1–30% of said colloidal silica by weight.

7. Method as claimed in claim 1 in which said aqueous solution contains 0.01–1.0 mol/l of said selected metal and 1–50% by weight of said aluminum nitrate.

8. Device for treating automotive exhaust produced by the process of claim 5.

9. Catalyst carrier produced by the process of claim 1.

* * * * *